United States Patent
Graff et al.

(10) Patent No.: US 12,137,053 B2
(45) Date of Patent: Nov. 5, 2024

(54) METHOD, SYSTEM AND COMPUTER PROGRAM PRODUCT FOR DETERMINING CONGESTION OF A COMMUNICATION LINK TRANSMITTING A MEDIA STREAM OVER THE COMMUNICATION LINK

(71) Applicant: Pexip AS, Oslo (NO)

(72) Inventors: Håvard Graff, Oslo (NO); Tulio Beloqui, Oslo (NO); Knut Inge Hvidsten, Oslo (NO)

(73) Assignee: Pexip AS, Oslo (NO)

( * ) Notice: Subject to any disclaimer, the term of this patent is extended or adjusted under 35 U.S.C. 154(b) by 257 days.

(21) Appl. No.: 17/989,138

(22) Filed: Nov. 17, 2022

(65) Prior Publication Data

US 2023/0155945 A1 May 18, 2023

(30) Foreign Application Priority Data

Nov. 18, 2021 (NO) .................................... 20211386
Sep. 9, 2022 (NO) .................................... 20220967

(51) Int. Cl.
*H04L 47/2416* (2022.01)
*H04L 47/11* (2022.01)
*H04L 47/283* (2022.01)

(52) U.S. Cl.
CPC .......... *H04L 47/2416* (2013.01); *H04L 47/11* (2013.01); *H04L 47/283* (2013.01)

(58) Field of Classification Search
None
See application file for complete search history.

(56) References Cited

U.S. PATENT DOCUMENTS

| | | |
|---|---|---|
| 2002/0010938 A1 | 1/2002 | Zhang et al. |
| 2003/0152032 A1 | 8/2003 | Yanagihara et al. |
| 2007/0236599 A1 | 10/2007 | van Beek |
| 2008/0120424 A1 | 5/2008 | Deshpande |
| 2010/0274872 A1 | 10/2010 | Harrang et al. |
| 2011/0026414 A1 | 2/2011 | Banerjee |
| 2011/0219287 A1* | 9/2011 | Srinivas ............... H04L 47/193 714/752 |
| 2013/0159495 A1 | 6/2013 | Wang et al. |
| 2013/0170451 A1* | 7/2013 | Krause ............... H04W 72/542 370/329 |
| 2014/0112120 A1 | 4/2014 | Kim et al. |
| 2016/0192233 A1 | 6/2016 | Sarker et al. |
| 2016/0212032 A1 | 7/2016 | Tsuruoka |
| 2019/0058666 A1 | 2/2019 | Pudlewski |
| 2021/0211368 A1 | 7/2021 | Zheng et al. |

(Continued)

FOREIGN PATENT DOCUMENTS

| | | |
|---|---|---|
| EP | 2019522 A2 | 1/2009 |
| WO | 2014160926 A1 | 10/2014 |

OTHER PUBLICATIONS

European Patent Office, European Search Report for corresponding Application No. EP 22207372.8, dated Mar. 27, 2023, 11 pages.

(Continued)

*Primary Examiner* — Mohamed Ibrahim
(74) *Attorney, Agent, or Firm* — Leech Tishman Fuscaldo & Lampl, LLC

(57) ABSTRACT

A system and method for determining congestion of a communication link transmitting a media stream over the communication link from a sender device to a receiving device.

13 Claims, 3 Drawing Sheets

(56) References Cited

U.S. PATENT DOCUMENTS

| | | | |
|---|---|---|---|
| 2021/0258106 A1* | 8/2021 | Rozenberg | H04L 12/1868 |
| 2021/0360475 A1 | 11/2021 | Wittberg et al. | |
| 2021/0392176 A1* | 12/2021 | Rozenberg | H04L 65/611 |
| 2022/0255866 A1 | 8/2022 | Guo et al. | |
| 2023/0032024 A1* | 2/2023 | Roy | H04B 7/18513 |
| 2023/0155945 A1 | 5/2023 | Graff et al. | |
| 2023/0156064 A1 | 5/2023 | Graff et al. | |
| 2023/0171299 A1 | 6/2023 | Graff et al. | |

OTHER PUBLICATIONS

European Patent Office, European Search Report for corresponding Application No. EP 22207369.4, dated Mar. 27, 2023, 12 pages.

Wenbo Liang et al., Research on Streaming Media Adaptive Congestion Control Technology, 2018 International Conference on Sensor Networks and Signal Processing (SNSP), Oct. 28, 2018, pp. 482-485.

Norwegian Industrial Property Office, Norwegian Search Report for corresponding Norwegian Application No. 20220967, dated Nov. 9, 2022, 2 pages.

European Patent Office, International Type Search Report for corresponding Norwegian Application No. 20211386, dated Nov. 18, 2021, dated Jun. 24, 2022, 13 pages.

Jaehyun Kim et al., "TCP CAE: An Improved Congestion Control Using Comparative ACK-Based Estimator", The Journal of Supercomputing, Kluwer Academic Publishers, BO, vol. 59, No. 2, Sep. 22, 2010, pp. 1019-1034, XP019990682.

Holmer H. Lundin et al., "A Google Congestion Control Algorithm for Real-Time Communication; draft-ietf-rmcat-gcc-02.txt" Internet Society (ISOC), Jul. 8, 2016, pp. 1-19, XP015114236.

Norwegian Industrial Property Office, Norwegian Search Report for corresponding Norwegian Application No. 20211386, dated May 2, 2022, 2 pages.

\* cited by examiner

METHOD, SYSTEM AND COMPUTER PROGRAM PRODUCT FOR DETERMINING CONGESTION OF A COMMUNICATION LINK TRANSMITTING A MEDIA STREAM OVER THE COMMUNICATION LINK

CROSS-REFERENCE TO RELATED APPLICATION

This application is related to and claims priority to Norwegian Patent Application No. 20211386, filed Nov. 18, 2021, and claims priority to Norwegian Patent Application No. 20220967, filed Sep. 9, 2022, the entirety of which is incorporated herein by reference.

FIELD

The present invention relates video conferencing, in particular to providing a method, system and computer program product for determining congestion of a communication link transmitting a media stream over the communication link from a sender device to a receiving device.

BACKGROUND

Transmission of audio and moving pictures in real-time is employed in several applications like e.g. video conferencing, team collaboration software, net meetings and video telephony. Terminals and endpoints being able to participate in a conference may be traditional stationary video conferencing endpoints, external devices, such as mobile and computer devices, smartphones, tablets, personal devices and PCs, and browser-based video conferencing terminals.

Video conferencing systems allow for simultaneous exchange of audio, video and data information among multiple conferencing sites. For performing multipoint video conferencing, there usually is a Multipoint Conferencing Node (MCN) that provides switching and layout functions to allow the endpoints and terminals of multiple sites to intercommunicate in a conference. Such nodes may also be referred to as Multipoint Control Units (MCUs), Multi Control Infrastructure (MCI), Conference Nodes and Collaborations Nodes (CNs). MCU is the most commonly used term, and has traditionally been associated with hardware dedicated to the purpose, however, the functions of an MCN could just as well be implemented in software installed on general purpose servers and computers, so in the following, all kinds of nodes, devices and software implementing features, services and functions providing switching and layout functions to allow the endpoints and terminals of multiple sites to intercommunicate in a conference, including (but not excluding) MCUs, MCIs and CNs are from now on referred to as MCNs.

The MCN links sites, endpoints and participants together by receiving conference signals from the sites/endpoints, processing the received signals, and transmitting the processed signals to appropriate sites/endpoints. The conference signals include audio, video, data and control information. The MCN processes the received conference signals from one or more sites/endpoints based on the requirements/capabilities of each site/endpoint receiving signals from the MCN.

FIG. 1 schematically illustrates multi-point videoconferencing system 100 with three videoconferencing terminals 101, 102, 103 in communication with a multipoint conferencing node (MCN) 104. In the multi-point videoconferencing system 100 media passes through the MCN 104. Input audio and video 101a, 102a, 103a captured at the videoconferencing terminals 101, 102, 103 is transmitted to the MCN 104, mixed with the audio and video from the other videoconferencing terminals, and the mixed audio and video 101b, 102b, 103b is transmitted back to the videoconferencing terminals 101, 102, 103.

A transcoding MCN comprises a plurality of encoders that may translate signals from one video or audio codec to another codec, change picture size, change video quality, change audio quality, change bitrate, combine conference signals from multiple participants into various layouts etc.

A switching MCN receives video and audio from each site/endpoint in a plurality of audio qualities, video qualities, picture sizes, and corresponding bitrates, and the switching MCU forwards audio and media streams to other sites/endpoints based on their capabilities and/or requirements. A switching MCN may for example receive four different media stream resolutions; 1080 p: 5000 Kbps video, 256 Kbps audio, 720 p: 2500 Kbps video, 256 Kbps audio, 560 p: 1500 Kbps video, 256 Kbps audio, and/or 360 p: 500 Kbps video, 128 Kbps audio.

Network resources are in general limited. A video conferencing session may occupy a considerable part of available network resources, in particular in home-networks, when the media transmitted from the MCN are of high quality and/or sent with high bitrates. Congestion occurs when more data is sent than a receiving network is capable of receiving. In this state packet delay and packet loss occur, and the quality of service is poor. A participant in a video conferencing session on a congested network may then experience frozen images, broken audio etc. The participant may perceive this as a problem at the video conferencing service provider, e.g. the MCN, even when it the participant's home network that is to blame. It is therefore necessary to provide congestion control at the sender side to avoid sending more data than a network path to a receiver can handle. Upon determining a candidate congestion state, the sender side will then reduce the sent bitrate, i.e. perform downspeeding of the video conferencing link between the MCN and the participant/endpoint. Downspeeding can be defined as adjusting the bit rate down for adapting to reduced available bandwidths, when encoding media at multiple bit rates is possible.

However, the candidate congestion state may instead of congestion be due to a high constant packet loss over the communication link. Packed loss resilience methods, such as Forward Error Correction (FEC) and RTP retransmission (RTX) transmits recovery packets into the media stream, each recovery packet adapted to replace a missing packet of the media stream, such that the participants in the video conferencing session does not experience frozen images etc. Downspeeding the media stream in such a situation would reduce, rather than increase, the quality of service for a participant on the lossy network.

FIG. 2 is a schematic illustration of a prior art message flow 200 between a sender device 201 and a receiving device 202, the sender device transmitting a media stream 203 over a communication link to the receiving device 202. Transport-wide Congestion Control (TWCC) is an extension of the Real-time Transport Protocol (RTP) and Real-Time Transport Control Protocol (RTCP) for use in congestion control algorithms for RTP-based media flow. The packets of the media stream 203 comprises a RTP header extension containing a transport-wide packet sequence number, i.e. a packet identifier. TWCC proposes that the receiving device transmits an RTCP feedback message 204 feeding back the arrival times and sequence numbers of the packets of the media stream 203 received over the connection. The sender device keeps a map of in-flight packets, and upon receiving the feedback message 204 looks up the transmission timestamp of the corresponding packet. From these two timestamps the sender can compute metrics such as inter-packet delay variation and estimated queueing delay.

One prior art implementation of TWCC for congestion control is the Google Congestion Control (GCC) algorithm. In this algorithm an inter-arrival time, $t(i)-t(i-1)$, is defined as the difference in arrival time of two packets or two groups of packets. Correspondingly, an inter-departure time, $T(i)-T(i-1)$, is defined as the difference in departure-time of two packets or two groups of packets. The GCC algorithm determines that congestion is present when the inter-arrival time is larger than the inter-departure time. A problem with the GCC algorithm is that it is very sensitive for network jitter, thus the GCC algorithm may determine that the connection between sender and receiver is congested and initiate downspeeding when there is no congestion. This will reduce the quality of the video conferencing session when there really was no need to do so, hence reducing the user experience for a participant in the video conferencing session.

It is therefore a need in the art for a system and method for sender side congestion determination of a media stream transmitted over a communication link from the sender device to a receiving device.

SUMMARY

In view of the above, an object of the present invention is to overcome or at least mitigate drawbacks of prior art video conferencing systems.

In a first aspect the invention provides a method for determining congestion of a communication link transmitting a media stream over the communication link from a sender device to a receiving device, the method comprising the steps of:
  transmitting media packets into the media stream, each media packet having a packet identifier;
  transmitting recovery packets into the media stream, each recovery packet having a packet identifier and is adapted to replace a missing packet of the media stream;
  mapping for each packet in the media stream the packet identifier, a transmission timestamp and a packet size;
  mapping for each recovery packet the packet identifier of the recovery packet and the packet identifier of the packet the recovery packet is adapted to replace;
  transmitting for each packet received at the receiving device a feedback message to the sender device, the feedback message comprising the packet identifier and an arrival timestamp;
  determining a packet as missing when none of the feedback messages comprises the packet identifier of the packet;
  determining a packet as recovered when a feedback message comprises the packet identifier of a recovery packet corresponding to the missing packet;
  determining a packet recovery success rate by dividing a total number of packets determined as recovered within a first sliding window with a total number of packets determined as missing within the first sliding window; and determining that the communication link is congested when for the first sliding window of the N transmitted packets the packet recovery success rate is below a congestion threshold.

The present invention provides an accurate method for a sender device to differentiate between congestion of a communication link and high constant packet loss over the communication link.

In one embodiment, the congestion threshold may be in in the range 0.6-1.0, preferably 0.8.

In one embodiment, the method may comprise initiating the step of transmitting recovery packets into the media stream upon determining that the communication link is in a candidate congestion state.

In one embodiment, the method may comprise determining that the communication link is in a candidate congestion state, comprising:
  determining a transmission rate for a second sliding window of N transmitted packets by dividing a packet size sum of the N transmitted packets with a time difference between a transmission time stamp of the last of the N transmitted packets and a transmission time stamp of the first of the N transmitted packets;
  determining a received rate for the second sliding winding of the N transmitted packets by dividing the packet size sum of the N transmitted packets with a time difference between the arrival time stamp of the last of the N transmitted packets and the arrival time stamp of the first of the N transmitted packets; and
  determining that the communication link is in a candidate congestion state when for the second sliding window of the N transmitted packets the difference between the transmission rate and the received rate divided by the transmission rate is above a candidate congestion state threshold.

In one embodiment, the candidate congestion state threshold may be in the range 0.1-0.4, preferably 0.25.

In one embodiment, the method may comprise measuring a round trip delay from the receiving device requests a recovery packet to the feedback message comprises the packet identifier of the recovery packet, and waiting the at least one round trip delay before determining the packet recovery rate.

In a second aspect the invention provides a system for determining congestion of a communication link transmitting a media stream transmitted over the communication link from a sender device to a receiving device, the system being adapted to:
  transmitting, with the sender device, media packets into the media stream, each media packet having a packet identifier;
  transmitting, with the sender device, recovery packets into the media stream, each recovery packet adapted to replace a missing packet of the media stream;
  mapping, with the sender device, for each packet in the media stream a packet identifier, a transmission timestamp and a packet size;
  mapping, with the sender device, for each recovery packet the packet identifier of the recovery packet and the packet identifier of the packet the recovery packet is adapted to replace;
  transmitting for each packet received at the receiving device a feedback message to the sender device, the feedback message comprising the packet identifier and an arrival timestamp;

determining a packet as missing when none of the feedback messages comprises the packet identifier of the packet;

determining, with the sender device, a packet as recovered when a feedback message comprises the packet identifier of a recovery packet corresponding to the missing packet; and determining, with the sender device, a packet recovery success rate by dividing a total number of packets determined as recovered within a second sliding window with a total number of packets determined as missing within the second sliding window;

determining, with the sender device, that the communication link is congested when for the first sliding window of the N transmitted packets the packet recovery success rate is below a congestion threshold.

In one embodiment, the congestion threshold may be in in the range 0.6-1.0, preferably 0.8.

In one embodiment, the system may be further adapted to initiating the step of transmitting recovery packets into the media stream upon determining that the communication link is in a candidate congestion state.

In one embodiment, determining that the communication link is in a candidate congestion state may comprising:

determining, with the sender device, a transmission rate for a second sliding window of N transmitted packets by dividing a packet size sum of the N transmitted packets with a time difference between a transmission time stamp of the last of the N transmitted packets and a transmission time stamp of the first of the N transmitted packets;

determining, with the sender device, a received rate for the second sliding winding of the N transmitted packets by dividing the packet size sum of the N transmitted packets with a time difference between the arrival time stamp of the last of the N transmitted packets and the arrival time stamp of the first of the N transmitted packets; and determining, with the sender device, that the communication link is in a candidate congestion state when for the second sliding window of the N transmitted packets the difference between the transmission rate and the received rate divided by the transmission rate is above a candidate congestion state threshold.

In one embodiment, the candidate congestion state threshold may be in the range 0.1-0.4, preferably 0.25.

In one embodiment, the sender device may be further adapted to measuring a round trip delay from the receiving device requests a recovery packet to the feedback message comprises the packet identifier of the recovery packet, and waiting the at least one round trip delay before determining the packet recovery rate.

In a third aspect the invention provides a computer program product comprising instructions that when executed on a processor performs the method of the first aspect of the invention.

The second and the third aspect of the invention provides the same advantages as the first aspect of the invention.

DETAILED DESCRIPTION

According to embodiments of the present invention as disclosed herein, the above-mentioned disadvantages of solutions according to prior art are eliminated or at least mitigated.

Figure 1:
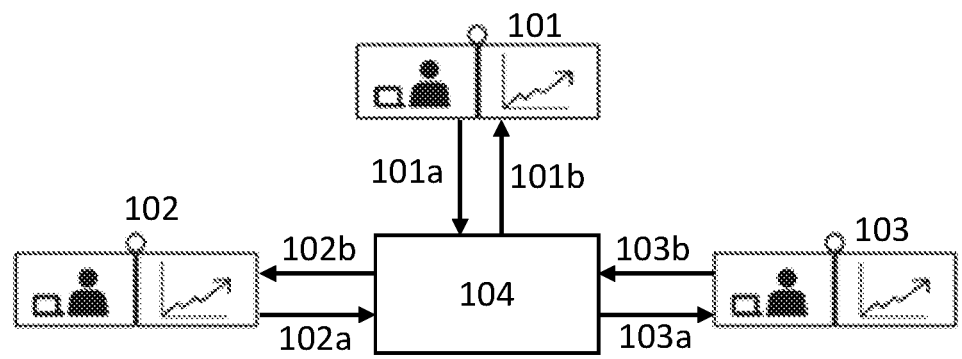
FIG. 1 is a schematic illustration of a multi-point videoconferencing system.
Figure 2:
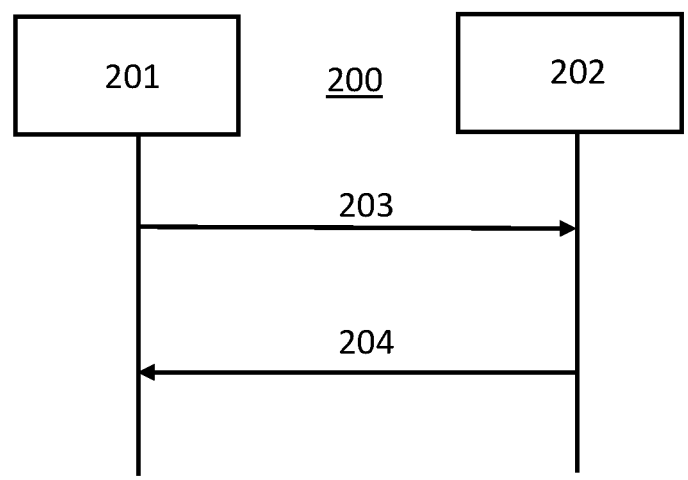
FIG. 2 is a schematic illustration of a message flow between a sender device and a receiving device.
Figure 3:
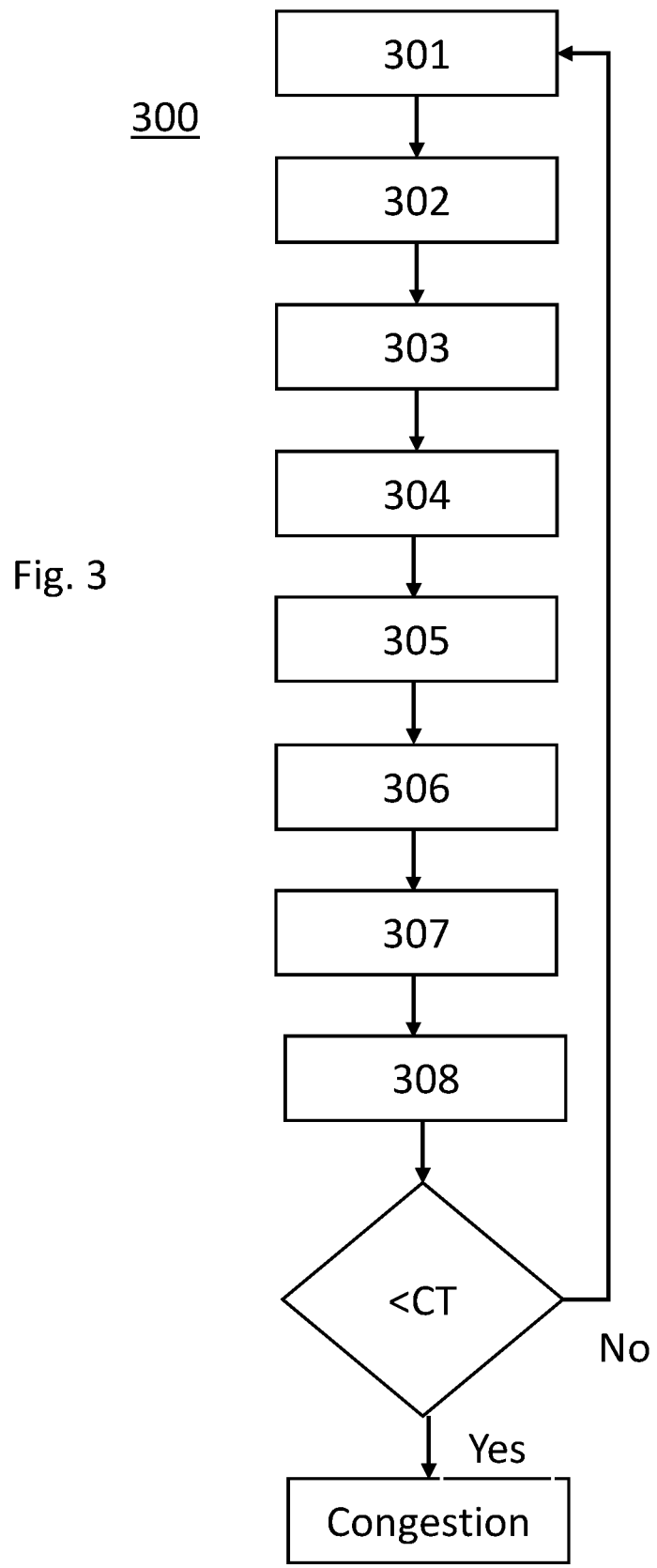
FIG. 3 is an exemplary flowchart illustrating an exemplary embodiment of the present invention.

FIG. 3 is a schematic illustration of an exemplary method 300 for determining congestion of a communication link transmitting a media stream over the communication link from the sender device 201 to the receiving device 202 in a multi-point videoconferencing system 100. The sender device 201 is preferably a MCN 104, however, the method 300 may also be performed by a videoconferencing endpoint 101a, 101b, 101c. The first step 301 comprises transmitting media packets into the media stream 203, each media packet having a packet identifier. The next step 302 comprises transmitting recovery packets into the media stream 203, each recovery packet adapted to replace a missing packet of the media stream 203. The recovery packets have a packet identifier similar to the media packets. The next step 303 comprises mapping for each packet in the media stream 203 the packet identifier, a transmission timestamp and a packet size. The packet identifier and the transmission timestamp may in one embodiment be implemented according to the definitions of TWCC. The packet size is a measurement of the size of the packet in the media stream in e.g. bits or bytes. Further, step 304 comprises mapping for each recovery packet the packet identifier of the recovery packet and the packet identifier of the packet the recovery packet is adapted to replace.

The next step 305 comprises transmitting for each packet received at the receiving device 202 a feedback message 204 to the sender device 201, the feedback message 204 comprising the packet identifier and an arrival timestamp. Thus, the receiving device 202 determines the arrival time of each packet in the media stream 203 and returns the arrival time in the arrival timestamp of the feedback message 204.

In the next step 306, the sender device 201 determines a packet as missing when none of the feedback messages 204 comprises the packet identifier of the packet. Then in step 307, the sender device determines a packet as recovered when a feedback message 204 comprises the packet identifier of a recovery packet corresponding to the missing packet.

Then in step 308, the sender device 201 determines a packet recovery success rate by dividing a total number of packets determined as recovered within a first sliding window with a total number of packets determined as missing within the first sliding window, and determines that the communication link is congested when for the first sliding window of the N transmitted packets the packet recovery success rate is below a congestion threshold, CT. The first sliding window of N transmitted packets may in one embodiment be the number of packets, e.g. 25 packets, or a time frame, e.g. 100 ms.

packet_recovery_success_rate=(number of recovered packets)/(number of missing packets).

The congestion threshold, CT, is in the range 0.6-1.0, preferably 0.8.

The method 300 of determining the packet recovery success rate, may in one embodiment further comprising the step of measuring a round trip delay from the receiving device 202 requests a recovery packet to the feedback message 204 comprises the packet identifier of the recovery packet, and waiting the at least one round trip delay before determining the packet recovery rate. The measurement of the round-trip delay gives packet loss resilience methods time to recover the missing packet before performing the determination.

In one embodiment, the step 302 of transmitting of transmitting recovery packets into the media stream 203 is initiated upon determining that the communication link is in a candidate congestion state, such as determining packet delay, packet loss occur or other reasons for poor quality of service (QoS).

Figure 4:
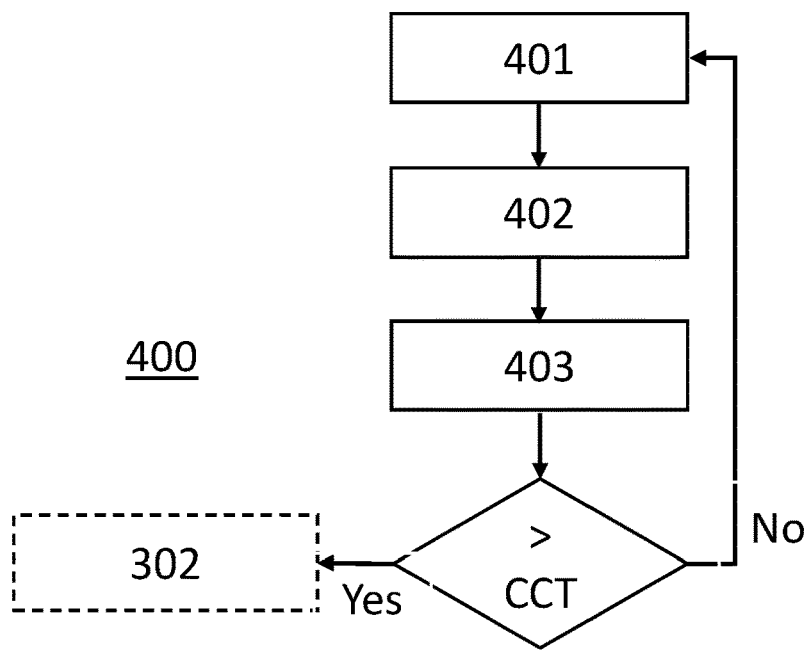
FIG. 4 is an exemplary flowchart illustrating an exemplary embodiment of the present invention.

FIG. 4 illustrates one exemplary method 400 of determining that the communication link 203 is in a candidate congestion state. In the first step 401, the sender device 201 determines a transmission rate for a second sliding window of N transmitted packets by dividing a packet size sum of the N transmitted packets with a time difference between a transmission time stamp of the last of the N transmitted packets and a transmission time stamp of the first of the N transmitted packets. The transmission rate is typically determined in bits/second. When determining the transmission rate for the second sliding window of N transmitted packets, the transmission rate is determined for consecutive windows of length N each time a new packet is transmitted from the sender device 201. The second sliding window of N transmitted packets may in one embodiment be the number of packets, e.g. 25 packets, or a time frame, e.g. 100 ms. Similarly, in the next step 402, the sender device 201 determines a received rate for the second sliding winding of the N transmitted packets by dividing the packet size sum of the N transmitted packets with a time difference between the arrival time stamp of the last of the N transmitted packets and the arrival time stamp of the first of the N transmitted packets.

Then in step 403, the sender device 201, determines that the communication link is in a candidate congestion state when for the second sliding window of the N transmitted packets the difference between the transmission rate and the received rate divided by the transmission rate is above a candidate congestion state threshold, CCT, i.e. norm_rate_delta>CCT, where norm_rate_delta=(transmission rate−received rate)/(transmission rate).

The candidate congestion state threshold, CCT, is in the range 0.1-0.4, preferably 0.25. One advantage of determining the communication link is in a candidate congestion state based on calculations of transmitted and received transmission rate is that the determination is resistant to network jitter.

If the sender device 201 comprises and encoder, e.g. is a transcoding MCN 104 or a videoconferencing endpoint 101a, 101b, 101c, the MCN 104 may instruct the encoder to reduce the transmission rate of the media stream.

In the sender device 201 does not comprises an encoder, e.g. a switching MCN 104, the MCN 104 may selecting and forwarding a media stream having a lower transmission rate than another media stream from an encoder providing a plurality of media streams at different transmission rates.

Figure 5:
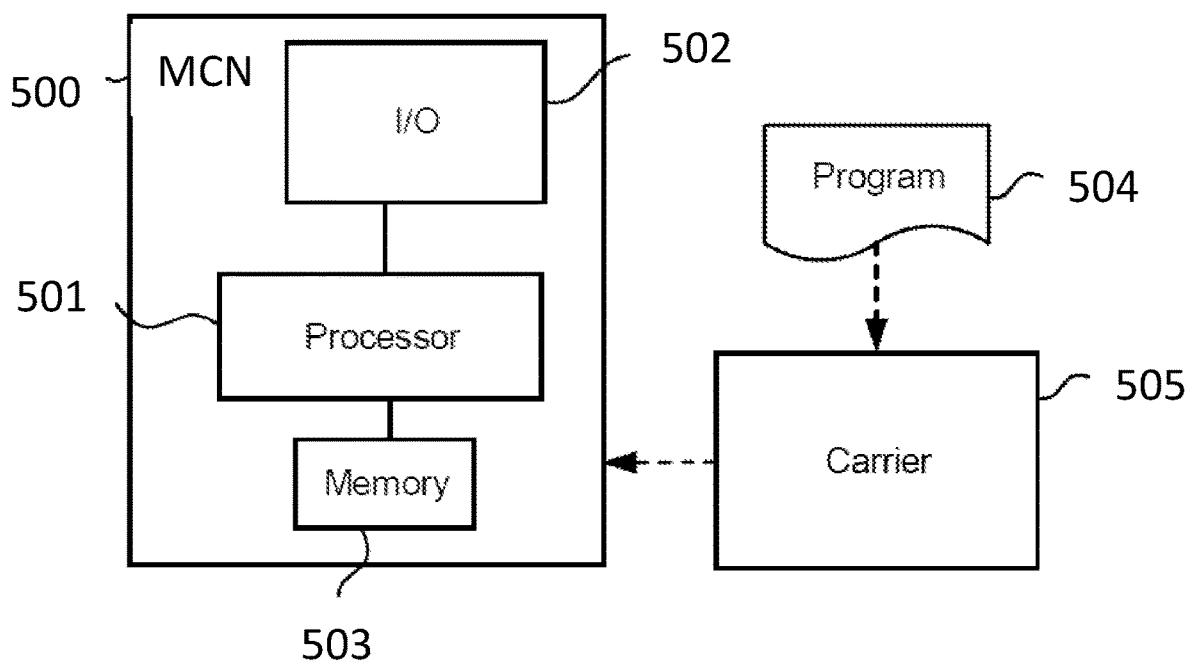
FIG. 5 is a schematically illustration of an exemplary sender device of the present invention.

Turning now to FIG. 5, a schematically illustrated multipoint conferencing node (MCN) 500. The MCN 500 comprises an input/output circuitry 502, at least one processor 501 and a memory 503. The memory 503 contains instructions executable by the processor 501, cause the MCN 500 to:

transmitting media packets into the media stream, each media packet having a packet identifier;

transmitting recovery packets into the media stream, each recovery packet having a packet identifier and is adapted to replace a missing packet of the media stream;

mapping for each packet in the media stream the packet identifier, a transmission timestamp and a packet size;

mapping for each recovery packet the packet identifier of the recovery packet and the packet identifier of the packet the recovery packet is adapted to replace;

transmitting for each packet received at the receiving device a feedback message to the sender device, the feedback message comprising the packet identifier and an arrival timestamp;

determining a packet as missing when none of the feedback messages comprises the packet identifier of the packet;

determining a packet as recovered when a feedback message comprises the packet identifier of a recovery packet corresponding to the missing packet; and determining a packet recovery success rate by dividing a total number of packets determined as recovered within a first sliding window with a total number of packets determined as missing within the first sliding window; and determining that the communication link is congested when for the first sliding window of the N transmitted packets the packet recovery success rate is below a congestion threshold.

The instructions that are executable by the processor 501 may be software in the form of a computer program 504. The computer program 504 may be contained in or by a carrier 505, which may provide the computer program 501 to the memory 503 and processor 501. The carrier 505 may be in any suitable form including an electronic signal, an optical signal, a radio signal or a computer readable storage medium.

As used herein, the term "computer readable medium" may be a universal serial bus (USB) memory, a digital versatile disc (DVD), a Blu-ray disc, a software module that is received as a stream of data, a Flash memory, a hard drive, a memory card, such as a MemoryStick, a multimedia card (MMC), secure digital (SD) card, etc. One or more of the aforementioned examples of computer readable medium may be provided as one or more computer program products.

In the preceding description, various aspects of the method and imaging processing device according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and image processing device, which are apparent to persons skilled in the art to which the disclosed subject matter pertains, are deemed to lie within the scope of the present claims.

What is claimed is:

1. A method for determining congestion of a communication link transmitting a media stream over the communication link from a sender device to a receiving device, the method comprising the steps of: transmitting media packets into the media stream, each media packet having a packet identifier; transmitting recovery packets into the media stream, each recovery packet having a packet identifier and is adapted to replace a missing packet of the media stream; mapping for each packet in the media stream the packet identifier, a transmission timestamp and a packet size; mapping for each recovery packet the packet identifier of the recovery packet and the packet identifier of the packet the recovery packet is adapted to replace; transmitting for each packet received at the receiving device a feedback message to the sender device, the feedback message comprising the packet identifier and an arrival timestamp; determining a packet as missing when none of the feedback messages comprises the packet identifier of the packet; determining a packet as recovered when a feedback message comprises the packet identifier of a recovery packet corresponding to the missing packet; and determining a packet recovery success rate by dividing a total number of packets determined as recovered within a first sliding window with a total number of packets determined as missing within the first sliding window; and determining that the communication link is congested when for the first sliding window of the N transmitted packets the packet recovery success rate is below a congestion threshold thereby differentiating between congestion of the communication links and a high constant packet loss over the communication link.

2. The method of claim 1, comprising initiating the step of transmitting recovery packets into the media stream upon determining that the communication link is in a candidate congestion state.

3. The method of claim 2, wherein determining that the communication link is in a candidate congestion state comprising: determining a transmission rate for a second sliding window of N transmitted packets by dividing a packet size sum of the N transmitted packets with a time difference between a transmission time stamp of the last of the N transmitted packets and a transmission time stamp of the first of the N transmitted packets; determining a received rate for the second sliding winding of the N transmitted packets by dividing the packet size sum of the N transmitted packets with a time difference between the arrival time stamp of the last of the N transmitted packets and the arrival time stamp of the first of the N transmitted packets; and determining that the communication link is in a candidate congestion state when for the second sliding window of the N transmitted packets the difference between the transmission rate and the received rate divided by the transmission rate is above a candidate congestion state threshold.

4. The method of claim 2, wherein the candidate congestion state threshold is in the range 0.1-0.4.

5. The method of claim 1, wherein the method further comprising the step of measuring a round trip delay from the receiving device requests a recovery packet to the feedback message comprises the packet identifier of the recovery packet, and waiting the at least one round trip delay before determining the packet recovery rate.

6. The method of claim 1, wherein the congestion threshold is in the range 0.6-1.0.

7. A computer program product comprising non-transitory computer-readable storage medium storing instructions that when executed on a processor performs the method of claim 1.

8. A system for determining congestion of a communication link transmitting a media stream transmitted over the communication link from a sender device to a receiving device, the system being adapted to: transmitting, with the sender device, media packets into the media stream, each media packet having a packet identifier; transmitting, with the sender device, recovery packets into the media stream, each recovery packet adapted to replace a missing packet of the media stream; mapping, with the sender device, for each packet in the media stream a packet identifier, a transmission timestamp and a packet size; mapping, with the sender device, for each recovery packet the packet identifier of the recovery packet and the packet identifier of the packet the recovery packet is adapted to replace; transmitting for each packet received at the receiving device a feedback message to the sender device, the feedback message comprising the packet identifier and an arrival timestamp; determining a packet as missing when none of the feedback messages comprises the packet identifier of the packet; determining, with the sender device, a packet as recovered when a feedback message comprises the packet identifier of a recovery packet corresponding to the missing packet; and determining, with the sender device, a packet recovery success rate by dividing a total number of packets determined as recovered within a second sliding window with a total number of packets determined as missing within the second sliding window; determining, with the sender device, that the communication link is congested when for the first sliding window of the N transmitted packets the packet recovery success rate is below a congestion threshold thereby differentiating between congestion of the communication links and a high constant packet loss over the communication link.

9. The system of claim 8, wherein the system is further adapted to initiating the step of transmitting recovery packets into the media stream upon determining that the communication link is in a candidate congestion state.

10. The system of claim 9, wherein determining that the communication link is in a candidate congestion state comprising: determining, with the sender device, a transmission rate for a second sliding window of N transmitted packets by dividing a packet size sum of the N transmitted packets with a time difference between a transmission time stamp of the last of the N transmitted packets and a transmission time stamp of the first of the N transmitted packets; determining, with the sender device, a received rate for the second sliding winding of the N transmitted packets by dividing the packet size sum of the N transmitted packets with a time difference between the arrival time stamp of the last of the N transmitted packets and the arrival time stamp of the first of the N transmitted packets; and determining, with the sender device, that the communication link is in a candidate congestion state when for the second sliding window of the N transmitted packets the difference between the transmission rate and the received rate divided by the transmission rate is above a candidate congestion state threshold.

11. The system of claim 10, wherein the candidate congestion state threshold is in the range 0.1-0.4.

12. The system of claim 8, wherein the sender device is further adapted to measuring a round trip delay from the receiving device requests a recovery packet to the feedback message comprises the packet identifier of the recovery packet, and waiting the at least one round trip delay before determining the packet recovery rate.

13. The system of claim 8, wherein the congestion threshold is in the range 0.6-1.0.

* * * * *